United States Patent [19]

Nagata et al.

[11] Patent Number: 4,461,142
[45] Date of Patent: Jul. 24, 1984

[54] METHOD OF RECOVERY OF EXCESS GAS ENERGY OF BLAST FURNACE GAS

[75] Inventors: Osamu Nagata, Kobe; Satoru Matsukura, Miki; Hajime Yamada, Kobe; Yozo Sasaki, Kurashiki, all of Japan

[73] Assignee: Kawasaki Jukogyo Kabushiki Kaisha, Kobe, Japan

[21] Appl. No.: 366,907

[22] Filed: Apr. 9, 1982

[30] Foreign Application Priority Data

Apr. 15, 1981 [JP] Japan .................................. 56-56635

[51] Int. Cl.$^3$ .............................................. F02C 6/00
[52] U.S. Cl. .................................. 60/39.02; 60/39.15
[58] Field of Search ................. 60/39.02, 39.07, 39.12, 60/39.15; 266/144, 159

[56] References Cited

U.S. PATENT DOCUMENTS

| 4,067,557 | 1/1978 | Inubushi et al. | 60/39.02 |
| 4,069,660 | 1/1978 | Inubushi et al. | 60/39.02 |
| 4,072,006 | 2/1978 | Inubushi et al. | 60/39.02 |
| 4,163,364 | 8/1979 | Shirato et al. | 60/39.02 |
| 4,180,249 | 12/1979 | Agranovskaya et al. | 60/39.15 |
| 4,387,562 | 6/1983 | Takao et al. | 60/39.15 |

Primary Examiner—Louis J. Casaregola

Attorney, Agent, or Firm—Jordan and Hamburg

[57] ABSTRACT

A method of recovery of furnace gas energy for use to recover excess gas energy from a single or a plurality of furnace gas energy recovering plants each including an expansion turbine mounted in each exhaust system of each blast furnace. In one embodiment, excess gas beyond the power of the respective expansion turbine to recover is removed from each exhaust system of each blast furnace concerned through a branch line, and the removed excess gas is introduced into another expansion turbine through a pressure control valve, to thereby recover the energy possessed by the excess gas. In another embodiment, excess gas is removed through a branch line from each exhaust system of each plant having excess gas beyond the power of the respective expansion turbine to recover mounted in each blast furnace, and the removed excess gas is introduced through a pressure control valve and a flow distribution valve into at least one plant having reserve in the furnace gas energy recovering capacity to thereby recover the energy possessed by the excess gas.

The pressure control valve is regulated by pressure control valve regulating means having the functions of furnace gas pressure control and backflow prevention.

5 Claims, 5 Drawing Figures

GOVERNOR VALVE OPENING
(EXCESS GAS ENERGY RECOVERY TURBINE)

METHOD OF RECOVERY OF EXCESS GAS ENERGY OF BLAST FURNACE GAS

BACKGROUND OF THE INVENTION

This invention relates to a method of recovery of excess gas energy for furnace gas energy recovering plants for recovering the energy of furnace gas from one or a plurality of blast furnaces through an expansion turbine mounted in each exhaust gas system of each blast furnace.

Heretofore, a furnace gas energy recovering plant comprises an expansion turbine mounted in the exhaust system of a blast furnace for recovering the energy possessed by furnace gas by converting same into electric power. In this case, an attempt is made to introduce as much gas as possible to the expansion turbine to maximize the volume of recovered gas.

However, as the blast furnace shows a change in the pattern of its operation and the volume of furnace gas produced increases, it is impossible to handle all the gas by the available expansion turbine. Thus it has hitherto been usual practice to pass excess gas through a septum valve for adjusting furnace gas pressure, to release same to outside without recovering.

Particularly in an iron foundary having a plurality of blast furnaces, the present tendency is that it is impossible to neglect the total volume of excess gas from these blast furnaces. The gas flowing through the septum valve produces a large amount of noise, making it necessary to provide measures to cope with the situation. When the blast furnaces slow down their operations, reserve is provided to the energy recovering ability of the foundary. Thus the blast furnaces tend to become unbalanced in the production of furnace gas.

SUMMARY OF THE INVENTION

This invention has as its object the provision of a method of recovery of the energy of excess furnace gas for a plant capable of collecting excess gas beyond the power of an expansion turbine mounted in one blast furnace or each of a plurality of blast furnaces to collect, so as to effectively recover the energy of excess gas for the plant as a whole.

The aforesaid object is accomplished according to the invention by providing, for furnace gas energy recovering plants for a single or a plurality of blast furnaces for recovering the energy of the blast furnace or furnaces through each expansion turbine mounted in each exhaust system of each blast furnace, a method of recovering the energy of excess furnace gas wherein excess gas beyond the power of the expansion turbine mounted in each blast furnace to recover is led through a branch line from the exhaust system of each blast furnace and collected through a pressure control valve regulated by pressure control valve regulating means having the functions of furnace gas pressure control and backflow prevention, to be introduced into a separate expansion turbine or to be supplied through a flow distribution valve controlled by flow distributing means to another plant having reserve in furnace gas energy recovering capacity.

DESCRIPTION OF THE PREFERRED EMBODIMENTS

Figure 1:
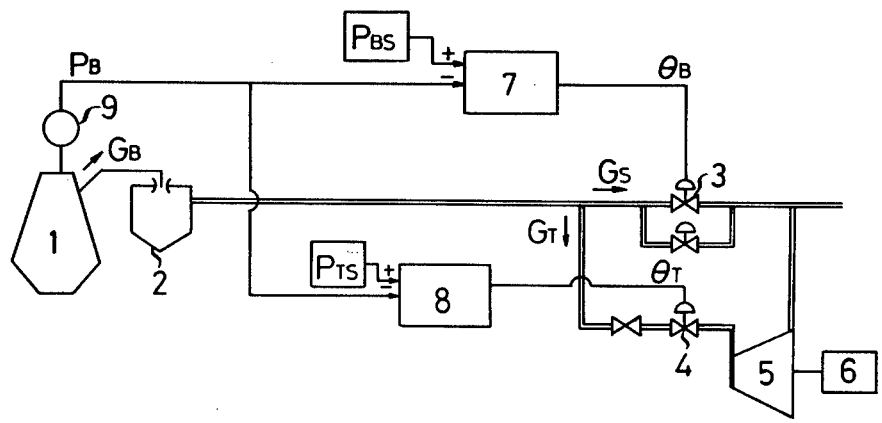
FIG. 1 is a circuit diagram of a furnace gas energy recovering plant of the prior art.

A furnace gas energy recovering plant system of this type of the prior art will be outlined before describing the embodiments of the invention by referring to FIG. 1. A blast furnace 1 produces furnace gas which is scrubbed by a scrubber 2. A portion of the scrubbed furnace gas is passed through a septum valve 3 while the rest of the furnace gas is passed through a governor valve 4 and an expansion turbine 5 before they are combined into a single flow of gas which is supplied to a process step on the downstream side, if necessary. The numeral 6 designates a load applied to the expansion turbine 5.

Meanwhile the furnace gas pressure $P_B$ of the blast furnace 1 is sensed by a furnace gas pressure detector 9 and compared with a furnace gas pressure set point $P_{BS}$ for the septum valve 3 by furnace gas pressure control means 7. The difference between the two values is proportionated, integrated or differentiated as the case may be to provide a septum valve command signal $\theta_B$. The septum valve 3 is actuated by the septum valve command signal $\theta_B$ to control the furnace gas pressure $P_B$ to keep it at the furnace gas pressure set point $P_{BS}$ for the septum valve. The governor valve 4 of the expansion turbine 5 is actuated by a turbine governor 8. However, in a normal operation mode other than special operation modes, such as startup and shutdown, the turbine governor 8 compares a furnace gas pressure set point $P_{TS}$ for the governor valve 4 with the furnace gas pressure $P_B$ detected by the furnace gas pressure detector 9 and the difference between the two values is proportionated, integrated or differentiated as the case may be to provide a governor command signal $\theta_T$ which actuates the governor valve 4 of the expansion turbine 5, to control the furnace gas pressure $P_B$ to keep it at the furnace gas pressure set point $P_{TS}$ for the governor valve 4.

In normal operation mode, the furnace gas pressure set point $P_{TS}$ for the governor valve 4 is set at a level slightly lower than the furnace gas pressure set point $P_{BS}$ for the septum valve 3. Because of this, when the flow rate $G_B$ of the gas generated in the blast furnace is low or when the total volume of gas generated in the blast furnace can be made to flow through the expansion turbine 5, control is effected in such a manner that the turbine governor valve 4 keeps the furnace gas pressure $P_B$ constant while the septum valve 3 remains full closed. When the flow rate $G_B$ of the gas generated in the blast furnace increases and the furnace gas pressure $P_B$ further increases even if the governor valve 4 is brought to a full open position until it becomes necessary for the turbine governor valve 4 to effect control, the septum valve 3 is actuated to effect control of the furnace gas pressure for the septum valve 3 to keep it at the set point $P_{BS}$, so that the excess gas passing through the septum valve 3 can have its energy recovered before being exhausted.

The invention will now be described by referring to the embodiment shown in the drawings.

Figure 2:
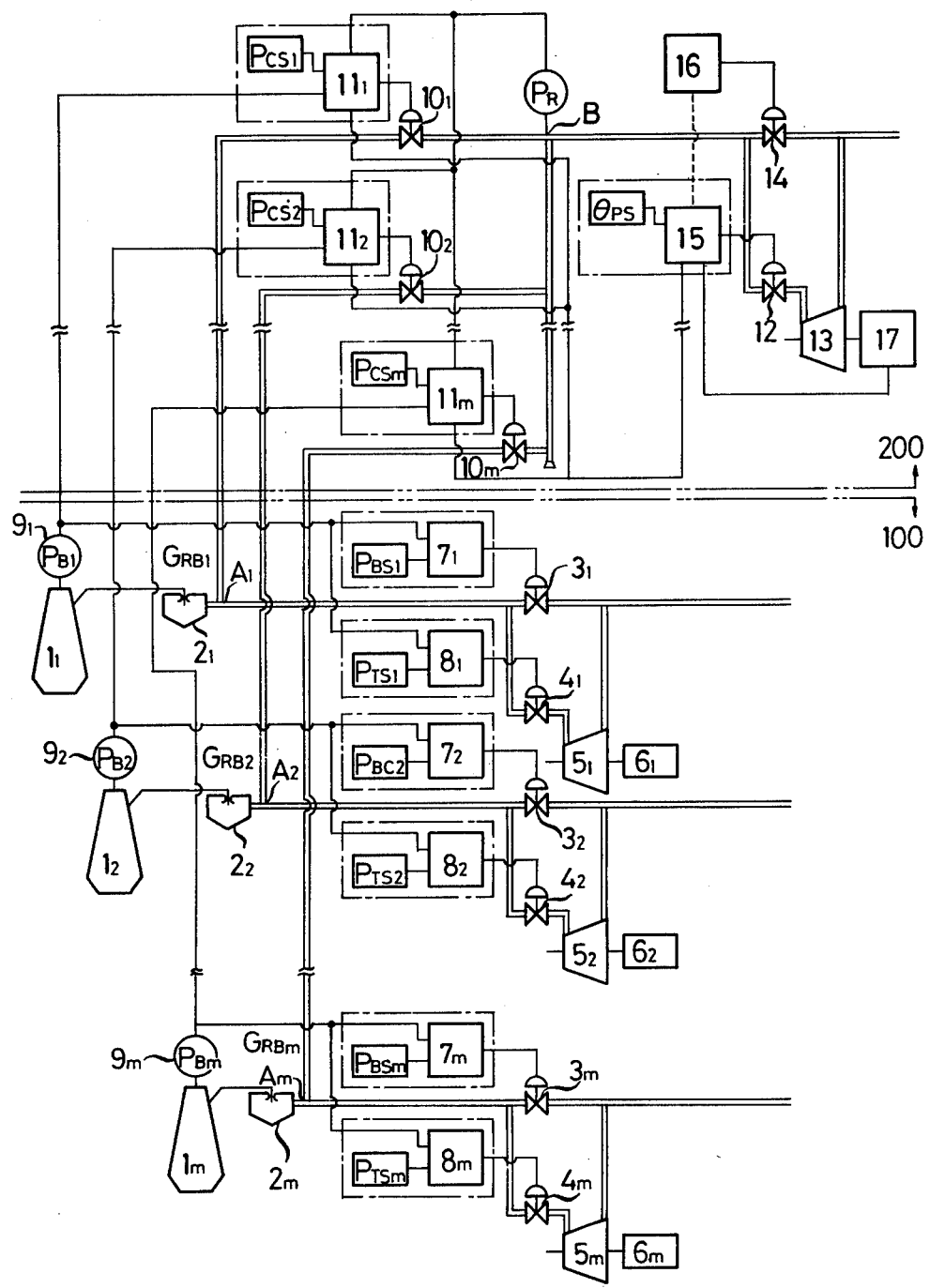
FIG. 2 is a circuit diagram of one embodiment of the invention.

FIG. 2 shows one embodiment of the invention, in which a system for recovering excess gas energy from a group of furnace gas energy recovering plants each including an expansion turbine mounted in each exhaust gas system of each of a plurality of blast furnace is shown. In the system shown, excess gas of each plant is introduced into a single expansion turbine, to recover excess gas energy. 100 designates the group of furnace gas energy recovering plant, and 200 designates an excess furnace gas energy recovering plant. The group of furnace gas energy recovering plants 100 comprises m sets of furnace gas energy recovering plants. Each plant is of the same construction as the furnace gas energy recovering plant of the prior art shown in FIG. 1. The blast furnaces $1_1$–$1_m$ of the furnace gas energy recovering plants 100 each have a branch line connected to the exhaust gas system at a point $A_1$–$A_m$, to supply to the excess gas energy recovering plant 200 the excess gas $G_{RB1}$–$G_{RBm}$ in flow rate that is beyond the power of each expansion turbine $5_1$–$5_m$ mounted in each exhaust gas system to recover. The excess gas energy recovering plant 200 is constructed such that the excess gas led from the furnace gas energy recovering plants 100 in the flow rate of $G_{RB1}$–$G_{RBm}$ through each branch line to the excess gas energy recovering plant 200 is passed through each pressure control valve $10_1$–$10_m$, and the streams of excess gas released from the pressure control valves $10_1$–$10_m$ are combined into a single stream at a point of confluence B from which the excess gas is passed through a governor valve 12 to an expansion turbine 13. When the expansion turbine 13 is in abnormal operation or transitory mode, the excess gas is led through a bypass valve 14 to thereby bypass the governor valve 12 and the expansion turbine 13. Meanwhile a control system for the excess gas energy recovering plant 200 comprises pressure control valve regulating means $11_1$–$11_m$ actuating the pressure control valves $10_1$–$10_m$ respectively, governor valve regulating means 15 for regulating the governor valve 12, and bypass valve regulating means 16. 17 designates a load applied to the expansion turbine 13.

Figure 3:
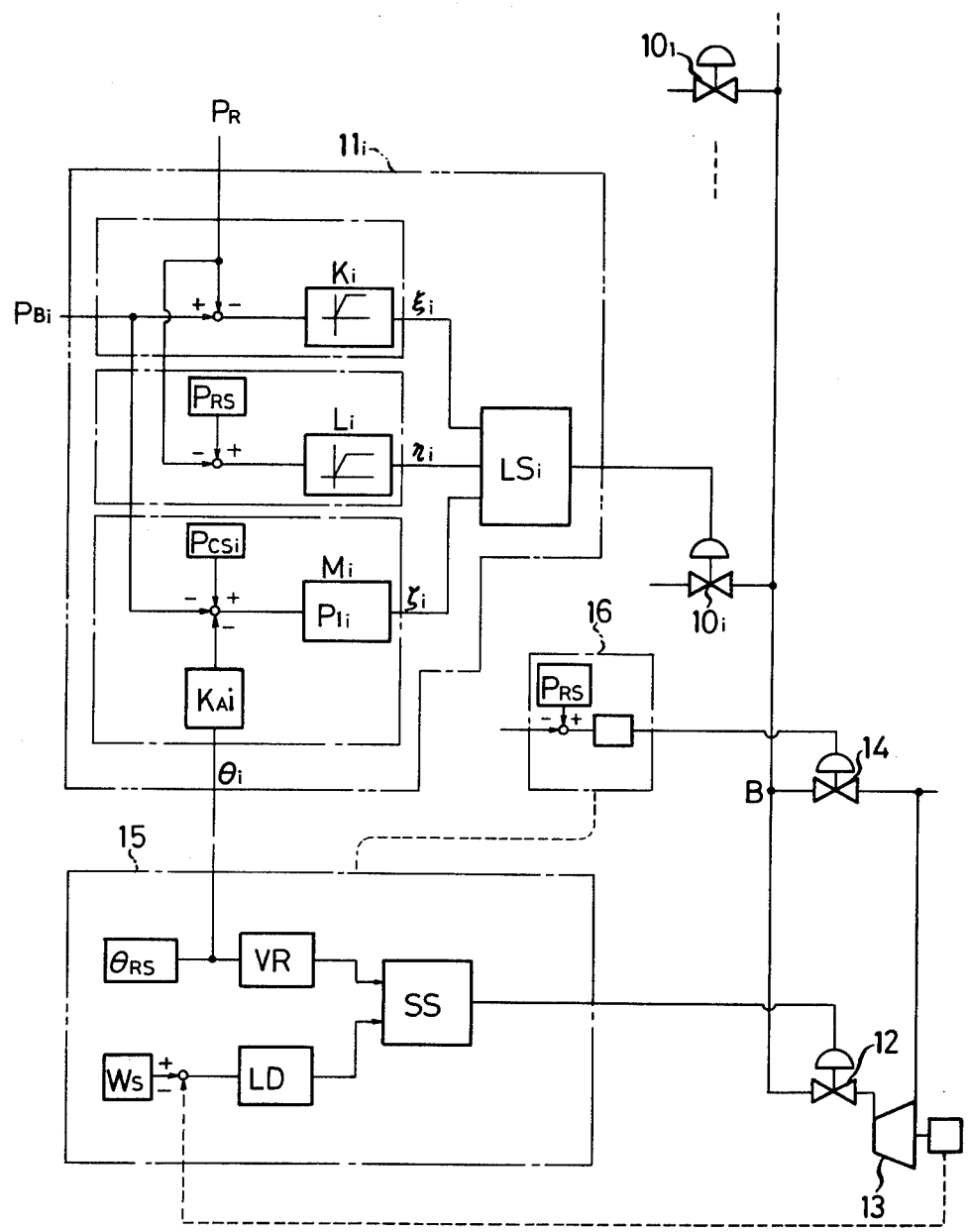
FIG. 3 is a block diagram of the pressure control valve regulating means of the excess gas energy recovering plant shown in FIG. 2.

FIG. 3 shows in a block diagram the pressure control valve regulating means $11_i$ regulating the pressure control valve $10_i$ mounted in the line branching from the ith blast furnace $1_i$ of the group of furnace gas energy recovering plants 100. In the figure, $K_i$, $L_i$ and $M_i$ are a backflow preventing section, a turbine pressure withstanding protection section and a pressure control section respectively.

In the backflow preventing section $K_i$, the furnace gas pressure $P_{Bi}$ of the blast furnace $1_i$ is compared with a pressure $P_R$ at the point of confluence B of the streams of excess gas and calculation is done in a suitable manner. Then, when the furnace gas pressure $P_{Bi}$ is higher than the confluence pressure $P_R$, a signal $\xi_i$ is produced to open the pressure control valve $10_i$, when the furnace gas pressure $P_{Bi}$ is lower than the confluence pressure $P_R$, the signal $\xi_i$ acts to bring the pressure control valve $10_i$ to a full closed position to prevent backflow of the excess gas from occurring at all times. In the turbine pressure withstanding section $L_i$, the confluence pressure $P_R$ is compared with an allowable pressure $P_{RS}$ on the downstream side of the confluence B and calculation is done in a suitable manner. When $P_R$ is higher than $P_{RS}$, a signal $\eta_i$ is produced to bring the pressure control valve $10_i$ to a full closed position; when $P_R$ is lower than $P_{RS}$, the signal $\eta_i$ acts to open the pressure control valve $10_i$, so as to keep the allowable pressure $P_{RS}$ from being exceeded by the pressure at the point of confluence at all times. In the pressure control section $M_i$, a signal $\zeta_i$ is produced as an output and supplied to the pressure control valve $10_i$ after deducting from a furnace gas pressure set signal $P_{CSi}$ and a signal $\theta_i$ which is a function of a governor control valve opening presently to be described, comparing the difference with the furnace gas pressure $P_{Bi}$, and doing calculation in a suitable manner, such as proportionating, integrating, etc., so as to keep the furnace gas pressure $P_{Bi}$ at a value which is a function of the opening of the governor valve 12. The three signals $\xi_i$, $\eta_i$ and $\zeta_i$ are supplied to a lower level selector $L_{Si}$ which selects a signal for keeping the opening of the pressure control valve $10_i$ at the minimum level for controlling the pressure control valve $10_i$ by such signal.

Figure 4:
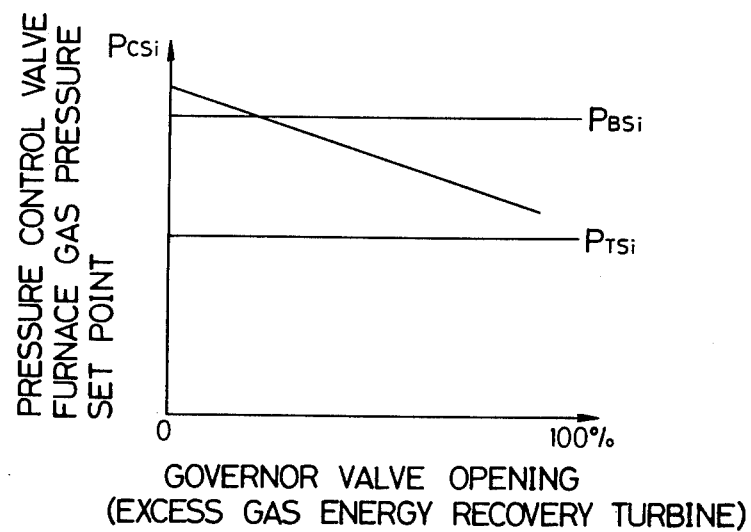
FIG. 4 is a graph showing the relation between the governor valve opening and the furnace set point for the pressure control valve.

In this way, all the streams of excess gas are controlled by the respective pressure control valves $10_1$–$10_m$ and combined into a single stream at the point of confluence B and have the flow rate controlled by the governor valve 12 before being led to the expansion turbine 13. The governor valve regulating means 15 comprises a governor valve opening control section VR for controlling the opening of the governor valve 12, a load control section LD for keeping constant the load 17 actuated by the expansion turbine 13 and a selecting section SS, so that a necessary function will be selected in accordance with the operation condition to recover the excess gas energy. The governor valve regulating means 15 further has the abnormal condition coping function whereby, when the load of the expansion turbine 13 undergoes a sudden change or becomes abnormal and trip is indicated, the situation is detected and a command signal is supplied to bypass valve regulating means 16 subsequently to be described to open the valve, to thereby cause the excess gas flowing through the expansion turbine 13 to flow through the bypass valve 14 to minimize a change in the flow rate of excess gas on the upstream and downstream sides of the expansion turbine 13. The governor valve opening control section VR of the governor valve regulating means 15 provides as an output a signal $\theta_i$ which, being a function of the governor valve opening, is supplied to a gain converter $K_{Ai}$ of the pressure control valve regulating means $11_i$. By applying signal $\theta_i$ to the gain converter $K_{Ai}$, a furnace gas pressure setting signal $P_{CSi}$ applied to a pressure control section $M_i$ of the pressure control valve regulating means $11_i$ can be raised or lowered equivalently, to thereby lower, as when the expansion turbine 13 is started, the furnace gas pressure set point (from a point in time at which it drops below a septum valve furnace gas set point $P_{BSi}$) as the opening of the governor valve 12 increases, to thereby cause the pressure control valve $10_i$ to begin to open to enable the excess gas to be led to the expansion turbine 13, as shown in FIG. 4. Conversely, as the governor valve 12 of the expansion turbine 13 gradually closes from its full open position, the furnace gas set point of the pressure control valve $10_i$ gradually rises and the pressure control valve $10_i$ gradually closes, until it is brought to a full closed position. Thus the excess gas that has hitherto flowed into the expansion turbine 13 enters the exhaust gas system of each blast furnace and is released therefrom through the respective septum valve.

The bypass valve regulating means 16 has the following function. It normally keeps the bypass valve 14 in a full closed position and causes a portion of the excess gas to bypass the expansion turbine 13 only when the latter is in special operation condition. Also, when the operation condition of the expansion turbine 13 undergoes a sudden change or trip is indicated, the regulating means 16 temporarily acts to bring the bypass valve 14 suddenly to an open position.

The process of operation of the excess gas energy recovering plant 200 will now be described. To enable the excess gas energy recovering plant 200 to normally operate, it is necessary that the group of furnace gas energy recovering plants 100 be operating normally and the excess gas be released by flowing through each septum valve $3_1$–$3_m$. Assume that, when this is the case, the governor valve opening control section VR of the governor valve regulating means 15 of the excess gas energy recovering plant 200 is producing a signal to bring the governor valve 12 to a full closed position. In this case, the septum valve furnace gas pressure set point $P_{BSi}$, furnace gas energy recovery turbine control valve furnace gas pressure set point $P_{TSi}$ and the pressure control valve furnace gas pressure set point $P_{CSi}$ are related to one another as $P_{CSi} > P_{BSi} > P_{TSi}$, so that the furnace gas pressure of each blast furnace $1_1$–$1_m$ is controlled by the governor valve $4_1$–$4_m$ of the expansion turbine $5_1$–$5_m$ mounted in each exhaust gas system of each blast furnace or the septum valve $3_1$–$3_m$.

As the governor valve 12 of the expansion turbine 13 of the excess gas energy recovering plant 200 is gradually opened, the furnace gas pressure set point $P_{CSi}$ for the pressure control valve $10_i$ is reduced in value as a function of the opening of the governor valve 12, and the excess gas begins to flow through the pressure control valve $10_i$ of the system in which the relation $P_{BSi} > P_{CSi} > P_{TSi}$ holds. The streams of excess gas are combined at the point of confluence B into a single stream which is led to the excess gas recovery expansion turbine 13 through the governor valve 12. The governor valve opening set point $\theta_{RS}$ of the governor valve regulating means 15 is continuously raised until the governor valve 12 is brought to a full open position. At this time, if other control function is selected by the governor valve regulating means 15 for operating the expansion turbine 13, or a load control function is selected, for example, then the expansion turbine 13 is controlled by the selected load control mode. Each pressure control valve $10_1$–$10_m$ is controlled by one of the three functions (furnace gas pressure control, backflow prevention and pressure withstanding protection) of each pressure control valve regulating means $11_1$–$11_m$, to effect control of the flow rate of the excess gas. After being controlled in this way, all the excess gas is normally led to the expansion turbine 13, to enable the total energy possessed by the excess gas to be recovered.

The shutdown of the expansion turbine 13 for recovering the excess gas energy is effected as follows. The governor valve opening set point $\theta_{RS}$ is gradually lowered to close the governor valve 12. When the relation $P_{CSi} > P_{BSi}$ is established, the pressure control valve $10_i$ of the system concerned begins to close until it is brought to a full closed position. Further, the opening of the governor valve 12 is gradually reduced until it is brought to a full closed position. At the point in time at which the governor valve 12 is brought to a full closed position, the relation $P_{CSi} > P_{BSi}$ holds in all the systems, so that the pressure control valves $10_1$–$10_m$ are all brought to a full closed position and the excess gas energy recovering plant 200 is shut down.

Figure 5:
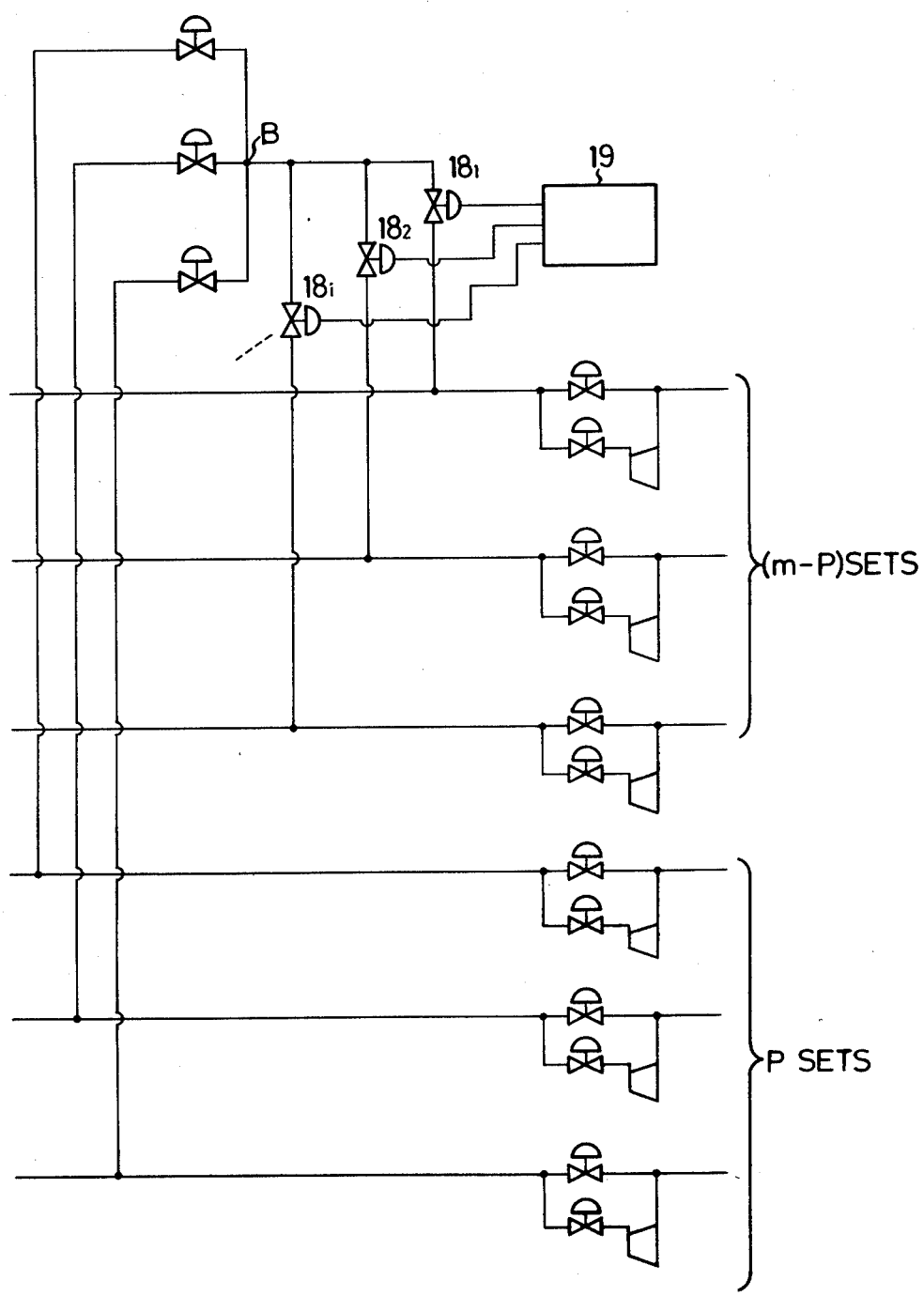
FIG. 5 is a circuit diagram of another embodiment.

In the embodiment shown and described hereinabove, the invention has been applied to a system for introducing the excess gas of a plurality of furnace gas energy recovering plants mounted on the m sets of exhaust gas systems of blast furnaces into a single excess gas energy recovering plant to recover the energy of the excess gas. As another embodiment, an excess gas energy recovering system will be described in which of the furnace gas energy recovering plants mounted in the exhaust systems of the m blast furnaces, the furnace gas energy recovering plants P in number are producing excess gas but the rest of the furnace gas energy recovering plants (m–P) in number are capable of still accomodating excess gas, due to a change in the operation mode, for example. In this case, the excess gas gathered from the P furnace gas energy recovering plants and supplied to the (m–P) furnace gas energy recovering plants capable of still accommodating the excess gas. FIG. 5 schematically shows this system in which the P furnace gas energy recovering plants of the group of m furnace gas energy recovering plants has their exhaust systems branched through branch lines so that streams of exhaust gas can flow to the point of confluence B at which they are combined into a single stream which is distributed through flow distribution valves $18_1$–$18_{m-p}$ to the respective exhaust systems of the (m–P) furnace gas energy recovering plants. The flow distribution valves $18_1$–$18_i$ are controlled by a signal from flow distribution means 19.

From the foregoing description, it will be appreciated that the invention makes it possible to recover, without affecting the operation condition of the blast furnace, excess gas energy from one or a plurality of furnace gas energy recovering plants.

What is claimed is:

1. The method of recovering energy from the exhaust gases from a plurality of blast furnaces comprising:
   passing exhaust gas from each of the blast furnaces through an exhaust gas line to a gas turbine thereby to recover energy from the exhaust gas;
   delivering excess gas from each of said exhaust gas lines into separate excess gas lines respectively connected to each of said exhaust gas lines;
   delivering all of said gas through said excess gas lines to a single line connected to each of the excess gas lines and to an additional gas turbine; and
   delivering the gas through the single line to the additional turbine to recover in the turbine energy contained in the gas.

2. The method of recovering energy from the exhaust gases from a plurality of blast furnaces comprising:
   passing exhaust gas from each of the blast furnaces through an exhaust gas line to a gas turbine thereby to recover energy from the gas;
   delivering excess gas from each of said exhaust gas lines into separate excess gas lines respectively connected to each of said exhaust gas lines, passing the gas through a pressure control valve in each said excess gas line which has pressure control valve regulating means to open and close said pressure control valve;
   delivering all of said gas from the excess gas lines to a single line connected to each of the excess gas lines and to an additional gas turbine, through a governor valve in said single line which has governor valve regulating means to open and close said governor valve; and delivering the gas through the single line and said governor valve to said additional turbine to recover in the turbine energy contained in the gas.

3. The method of claim 2 further comprising the steps of:

closing the pressure control valve when the pressure in the single line exceeds the pressure in the respective blast furnace thereby to prevent gas backflow to said furnace;

closing said pressure control valves to maintain the pressure in said single line below a determined pressure, thereby to protect said additional gas turbine from excess gas pressure; and actuating the governor valve regulating means to open the governor valve upon start up of said additional gas turbine and to close said governor valve upon shut down of said additional gas turbine and operating means cooperating with said governor valve regulating means to open said pressure control valves as said governor valve is opened and to close said pressure control valves when said governor valve is closed and said additional gas turbine is shut down.

4. An installation for recovering energy from the exhaust gases from a plurality of blast furnaces comprising:

a plurality of turbines for recovering energy from the exhaust gas in the respective blast furnaces;

a plurality of exhaust gas lines from each of the blast furnaces connected to respective turbines for recovering energy from the exhaust gas, each exhaust gas line including a valve in said exhaust gas line for regulating the flow of the exhaust gas to the turbine;

a plurality of excess gas lines connected to each of said exhaust gas lines, each excess gas line including a pressure control valve and means for opening and closing each pressure control valve;

a single line connected to all of said excess gas lines downstream therefrom, said single line including a governor valve and means for opening and closing said governor valve;

an additional gas turbine connected to said single line downstream from said governor valve for regulating the flow of the exhaust gas to the additional turbine;

means for sensing the pressure in each blast furnace and controlling the valve in each exhaust gas line for maintaining the pressure in each blast furnace at a predetermined level, sensing means for diversion of exhaust gas through each of said excess gas lines when the respective turbine has reached its capacity, said sensing means for diversion opening the pressure control valve upon the diversion, and sensing means for opening the governor valve upon the diversion to deliver the exhaust gas to the additional turbine for recovery of energy.

5. The installation of claim 4 in which said sensing means for diversion includes means for sensing the pressure in each blast furnace and the pressure of the gas in the single line and for closing the respective pressure control valve to prevent backflow of gas to the blast furnace through the respective excess gas line; and means for sensing the pressure in the single line and closing the pressure control valves to keep the pressure in said additional turbine below a determined safe pressure.

* * * * *